No. 819,236. PATENTED MAY 1, 1906.
W. A. LORENZ.
HERMETIC CLOSURE FOR RECEPTACLES.
APPLICATION FILED NOV. 17, 1904.

Witnesses:
H. Mallner
Jas. K. Green

Inventor
William A. Lorenz
By W. H. Howiss, Atty

UNITED STATES PATENT OFFICE.

WILLIAM A. LORENZ, OF HARTFORD, CONNECTICUT.

HERMETIC CLOSURE FOR RECEPTACLES.

No. 819,236.　　　Specification of Letters Patent.　　　Patented May 1, 1906.

Application filed November 17, 1904. Serial No. 233,087.

*To all whom it may concern:*

Be it known that I, WILLIAM A. LORENZ, a citizen of the United States, and a resident of Hartford, in the county of Hartford and State of Connecticut, have invented certain new and useful Improvements in Hermetic Closures for Receptacles, of which the following is a full, clear, and exact specification.

This invention relates to improvements in closures for the hermetic sealing of jars, tumblers, and other receptacles; and it consists in improved means whereby the cap and the gasket are combined so that the latter is secured against displacement during handling and sealing.

Although applicable to many styles of receptacles, the invention is here shown and described in connection with an ordinary glass tumbler as an example of a useful type of receptacle with which the invention may be advantageously employed.

Figure 1:
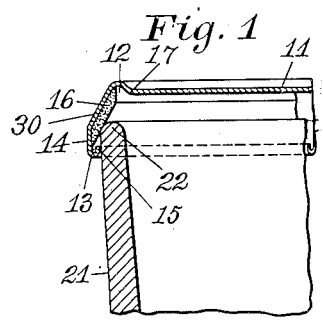
Figure 3:
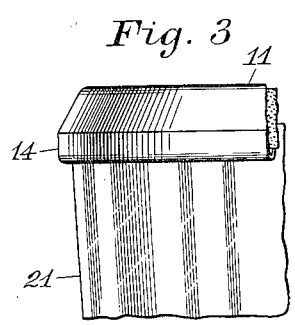
Figure 2:
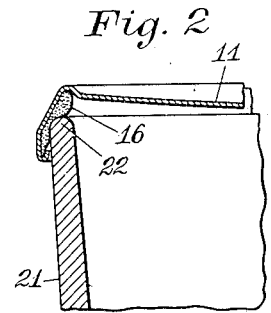
Figure 4:
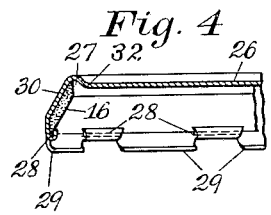
Figure 6:
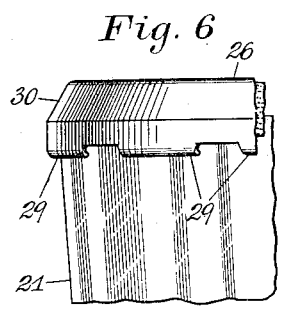
Figure 5:
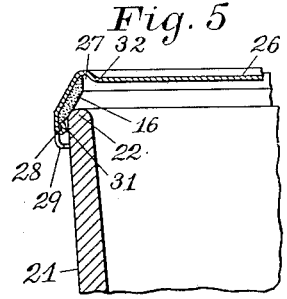
Figure 8:
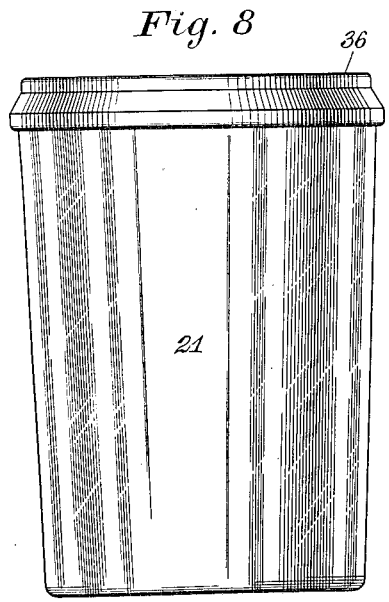
Figure 7:
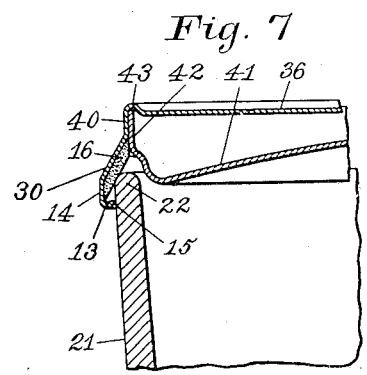

Figures 1 and 2 are fragmentary sectional side views of the top of a tumbler with its gasket and cap, Fig. 1 showing the parts in their exhausting or air-expelling position, while Fig. 2 shows the closure in its sealed position. Fig. 3 is a fragmentary side view similar to Fig. 1, showing the outward appearance of the cap and tumbler. Fig. 4 is a fragmentary sectional side view of a modified form of cap. Figs. 5 and 6 are fragmentary side views of the cap and gasket of Fig. 4 in position on a tumbler, Fig. 5 being in section and Fig. 6 showing the outward appearance of the cap. Fig. 7 is a fragmentary side view of a tumbler with another modified form of cap. Fig. 8 shows the outward appearance of a tumbler sealed with the closure of Fig. 7.

The cap 11, Figs. 1, 2, and 3, has the lower edge of its rim 14 turned in to form an upwardly-facing groove 13, which receives the lower edge of the gasket 16 and retains the gasket against displacement from the cap, the inner side of the groove forming an upwardly-projecting shoulder 15 for confining the lower edge of the gasket against inward displacement. The cross-section of the gasket 16 herein shown is approximately that of a rhomboid or rhombus, the two opposite parallel sides of which are coincident with the cylindrical inner and outer faces of the gasket. The adjacent surfaces of the cap and gasket are preferably formed to fit each other, so that the gasket forms a lining for the inner surface of the flaring rim 30 of the cap. The gasket may be inserted into the cap at any convenient time prior to the placing of the cap on the tumbler 21, and when so inserted it is securely held into the cap by the groove 13, so that the combined cap and gasket may be handled and shipped without danger of separation. The gaskets and caps may be assembled before reaching the packing-house, thus simplifying and expediting operations by avoiding the necessity of stretching the gasket separately over the jar. The top of the cap 11 is preferably indented to provide its under surface with a downwardly-facing groove 12, which receives the upper edge of the gasket 16 and assists to prevent the gasket from being displaced by handling and from being crowded upward by the tumbler-rim 22 when the cap is pressed down, the inner side of the groove forming a downwardly-projecting shoulder 17 for confining the upper edge of the gasket against inward displacement. In the ordinary hot processing of fruits and other goods the filled jar with the cap and gasket in place is put into a steam-chamber and cooked or heated. During this time the cap is held down by some extraneous means to prevent it from being displaced by the air which is forced out of the receptacle by the action of the heat. At such times the gasket is liable to be forced downwardly beyond the rim of the cap by the outgoing air, and thus displaced from its proper sealing position. With the present invention the groove 13 and shoulder 15 effectually prevent this displacement of the gasket and keep the parts in position to insure an effectual seal.

In Figs. 4, 5, and 6 the cap 26 is provided at its top with a downwardly-facing groove 27 and shoulder 32 similar to the groove 12 and shoulder 17 of the cap 11. The lower groove, however, is an interrupted groove, the edge of the cap-flange being turned inwardly at intervals only, as at 28, thus supporting the inner lower margin of the gasket by a series of short grooves and shoulders instead of by a continuous groove and shoulder, as in Fig. 1. The edge of the flange is preferably turned inwardly slightly at the intervals 29 between the short shoulders, so as not to leave a sharp edge on the bottom of the cap which would be liable to injure the hands in the subsequent handling of the sealed package.

In Fig. 7 the downwardly projecting-shoulder with which the cap 36 is provided for sustaining the upper edge of the gasket 16 is not made integral with the cap, as in Figs. 1 to 6, but is formed by the inner holder 41, of which the cylindrical portion 42 fits within a corresponding cylindrical portion 40 of the cap and projects therefrom far enough to provide the desired supporting-shoulder for the gasket. The inner holder 41 also serves a useful purpose in covering the contents of the jar and keeping the cap and contents from coming in contact with each other or injuriously affecting each other. The inner holder 41 may be made of paraffined or waterproofed paper, glass, sheet metal, or other suitable material. When made of sheet metal, the metal should either be non-corrosive or be protected by a coating of suitable lacquer or enamel. A downwardly-facing groove 43 is preferably provided in the top of the cap 36 for receiving the upper annular edge of the inner holder 41 to guard against the collapse of the holder under the strain of the gasket-pressure in the sealing operation. In order to still further secure the gasket 16 within the cap, the upwardly-projecting shoulder may be pressed against the lower inner margin of the gasket so as to pinch the gasket against the adjacent face of the flange, as shown at 31 in Fig. 5, and thus more surely secure the gasket to the cap, so as to prevent the gasket from being pushed upward out of place by the sealing edge of the receptacle when pressure is applied to the cap, even though no supporting-shoulder is provided in the cap for the upper edge of the gasket. Thus if the shoulders 17 and 32 of Figs. 1 and 5 or the inner holder 41 of Fig. 7 were not employed the pinching of the lower edge of the gasket to the cap would still effectually hold the gasket in position and prevent its upward movement.

I claim as my invention—

1. The combination with a gasket, of a flanged cap provided with a downwardly-projecting shoulder for engaging the upper margin of the inner face of the gasket and provided with an upwardly-projecting shoulder for engaging the lower margin of the inner face of the gasket.

2. A closure for hermetically-sealed receptacles, comprising a gasket having an approximately cylindrical face and an adjacent face forming an oblique angle therewith, and a cap having a gasket-receiving seat, a portion of which is inclined in substantial accordance with the oblique face of the gasket, and having the lower edge of its rim turned inwardly beneath the edge of the gasket.

3. A closure for hermetically-sealed receptacles, comprising a gasket having an approximately cylindrical face and an adjacent face forming an oblique angle therewith, and a cap having a gasket-receiving seat, a portion of which is inclined in substantial accordance with the oblique face of the gasket, and having the lower edge of its rim turned inwardly to form an upwardly-facing groove to support the edge of the gasket.

4. A closure for hermetically-sealed receptacles, comprising a gasket having an approximately rhombic or rhomboidal cross-section, the inner and outer faces of which are substantially cylindrical, and a cap having a receiving-seat, a portion of which is inclined in substantial accordance with one of the oblique angled faces of the gasket, and having the lower edge of its rim turned inwardly to form an upwardly-facing groove to support the gasket.

5. A closure for hermetically-sealed receptacles comprising a gasket having an approximately cylindrical face and an adjacent face forming an oblique angle therewith, and a cap having a gasket-receiving seat, a portion of which is inclined in substantial accordance with the oblique face of the gasket and provided with means for pinching the lower margin of the gasket.

6. The combination with a receptacle, of a hermetic-sealing closure, comprising a gasket having an acute-angled edge which projects at an inclination downwardly and across the sealing-seat of the receptacle, and a cap provided with means for pinching the lower margin of the gasket and having an inclined sealing portion for wedging the gasket against the sealing-seat of the receptacle.

7. A hermetic closure comprising a gasket, a flaring-cap provided with a shoulder in its lower portion to support the lower edge of the gasket, and a separate holder forming a downwardly-projecting shoulder for supporting the upper edge of the gasket.

8. The combination with a receptacle, of a hermetic-sealing closure, comprising a gasket having an acute-angled edge which projects at an inclination downwardly and across the sealing-seat of the receptacle, a separate holder forming a downwardly-projecting shoulder for supporting the upper edge of the gasket, and a cap having the lower edge of its rim turned inwardly beneath the gasket and having an inclined sealing portion for wedging the gasket against the sealing-seat of the receptacle.

9. The combination with a receptacle, of a hermetic-sealing closure, comprising a gasket having an acute-angled edge which projects at an inclination downwardly and across the sealing-seat of the receptacle, a holder forming a downwardly-projecting shoulder for supporting the upper edge of the gasket, and a cap having the lower edge of its rim turned inwardly beneath the gasket and having an inclined sealing portion for wedging the gasket against the sealing-seat of the receptacle, the cap being also provided with a downwardly-facing groove in its top to receive the upper edge of the holder.

10. The combination with a receptacle, of a hermetic-sealing closure comprising a gasket having an acute-angled edge which projects at an inclination downwardly and across the sealing-seat of the receptacle, a holder forming a downwardly-projecting shoulder for supporting the upper edge of the gasket, and a cap having the lower end of its flange turned under to pinch the lower margin of the gasket, and having an inclined sealing portion for wedging the gasket against the sealing-seat of the receptacle.

In testimony whereof I have signed my name to this specification in the presence of two subscribing witnesses.

WILLIAM A. LORENZ.

Witnesses:
JAS. W. GREEN,
H. MALLNER.